United States Patent [19]
Zedan

[11] Patent Number: 5,321,995
[45] Date of Patent: Jun. 21, 1994

[54] PARKING BRAKE PEDAL PAD

[75] Inventor: David M. Zedan, St. Clair Shores, Mich.

[73] Assignee: Chrysler Corporation, Highland Park, Mich.

[21] Appl. No.: 3,061

[22] Filed: Jan. 11, 1993

[51] Int. Cl.$^5$ .............................................. G05G 1/16
[52] U.S. Cl. ........................................ 74/563; 74/560; 74/512
[58] Field of Search ................. 74/563, 512, 513, 514; 425/127, 129.1

[56] References Cited

U.S. PATENT DOCUMENTS

| | | | |
|---|---|---|---|
| 1,210,016 | 12/1916 | Sunden | 74/563 |
| 2,069,066 | 1/1937 | Harbour | 74/563 |
| 2,584,831 | 2/1952 | Bashara | 74/563 |
| 2,587,220 | 2/1952 | Albers | 74/594.4 |
| 2,872,542 | 2/1959 | Thompson | 74/512 |
| 2,915,916 | 12/1959 | Hinsey et al. | 74/512 |
| 4,106,362 | 8/1978 | Hildebrecht | 74/512 X |

*Primary Examiner*—Vinh T. Luong
*Attorney, Agent, or Firm*—Edward A. Craig

[57] ABSTRACT

A pad for a pedal such as a brake pedal on an automotive vehicle is formed of two components, namely a body of a moldable, relatively soft material, and an insert of a relatively hard material having raised lettering on one surface. The body is molded about the insert in a manner such that the insert is completely encased in the body except for the tips of the lettering which project through and are visible at the surface of the body. The body and insert are formed of compatible materials, preferably including polypropylene, causing them to adhere and bond to one another after being molded together.

11 Claims, 2 Drawing Sheets

PARKING BRAKE PEDAL PAD

This invention relates to pads of the type used for pedals such as the brake pedal on an automotive vehicle.

BACKGROUND AND SUMMARY

Pads for levers such as brake pedals often carry indicia with operating instructions. For example, the parking brake pedal of an automobile may bear the lettering "PUSH TO RELEASE". Such lettering is typically applied to the brake pedal pad by a decal or sticker or by other similar techniques and wears off quite quickly.

In accordance with the present invention, the lettering is made of a relatively hard material and is imbedded and permanently anchored in a softer material. The softer material provides the proper feel and friction so that the operator's foot will not slip off the pad. The lettering projects through and is visible at the surface of the softer material.

One problem with this construction is that to successfully imbed the hard material in a softer material, the two materials must be compatible so that they adhere or cling together without the need of adhesives or primers. In the particular embodiment about to be described, the hard component is made of glass filled polypropylene, and the softer component is made of a compatible thermoplastic elastomer based on polypropylene. When the softer component is molded about the hard component under heat and pressure, a welding or bonding together of the compatible materials occurs, producing a virtually inseparable union of the two components.

Preferably the softer component or body of the brake pedal has a front face, and the hard component has a base which is completely imbedded in the body with lettering projecting from the base through the front face of the body. The base is mechanically locked in the softer material, as well as being, in effect, welded or bonded thereto.

It is an object of this invention to provide a pad for a brake pedal or the like which has the foregoing features.

Another object is to provide a pedal pad which is of a relatively simple and inexpensive construction, is rugged and durable in use, and is easy to manufacture.

Other objects, features and advantages will become more apparent as the following description proceeds, especially when considered with the accompanying drawings.

DETAILED DESCRIPTION

Figure 1:
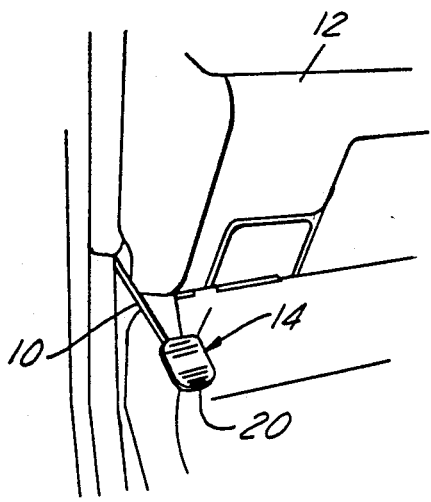
FIG. 1 is a fragmentary perspective view showing a parking brake pedal having a pad constructed according to the invention.
Figure 2:
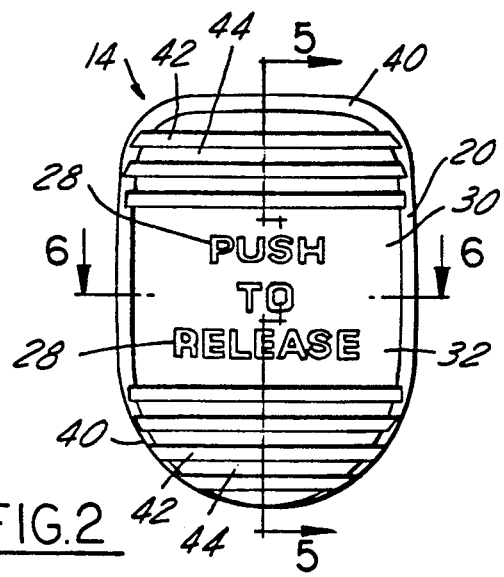
FIG. 2 is an enlarged plan view of the pad shown in FIG. 1.

Referring now more particularly to the drawings, a pivoted brake pedal lever 10 of an automobile is shown extending into the passenger compartment adjacent to the driver's seat and beneath the instrument panel 12. A pad 14 is fitted on the curved plate 16 at the end of the pedal lever 10. The pad 14 is composed of two components, a relatively hard component or insert 18 and a softer moldable component 20 in which the insert is encased.

Figure 3:
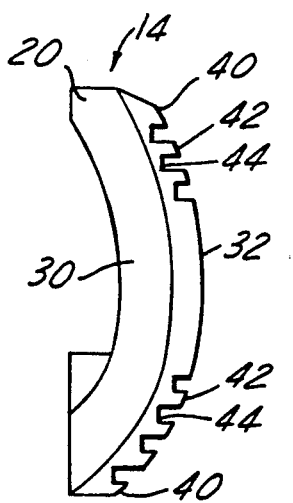
FIG. 3 is a side elevational view of the pad.
Figure 4:
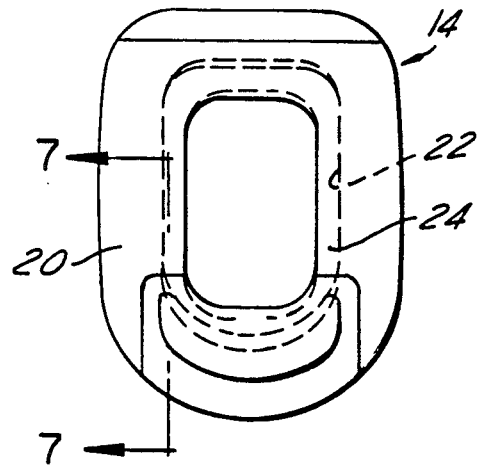
FIG. 4 is a rear view of the pad.
Figure 5:
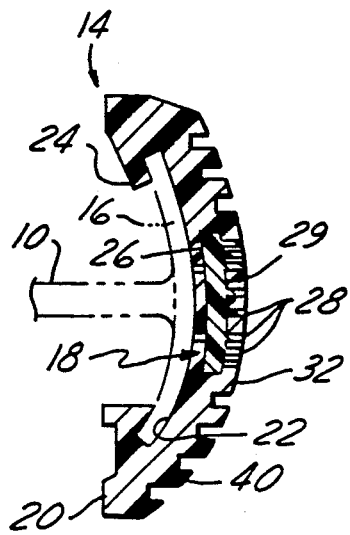
FIG. 5 is a sectional view taken on the line 5—5 in FIG. 2.
Figure 6:
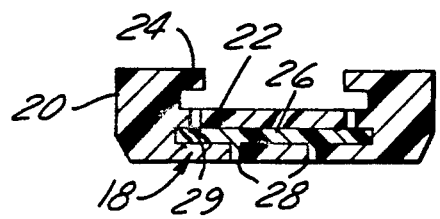
FIG. 6 is a sectional view taken on the line 6—6 in FIG. 2.
Figure 7:
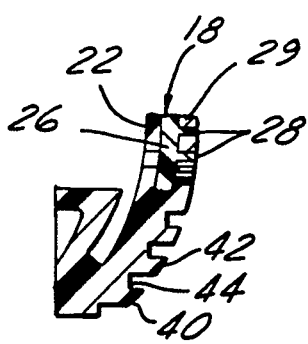
FIG. 7 is a sectional view taken on the line 7—7 in FIG. 4.
Figure 8:
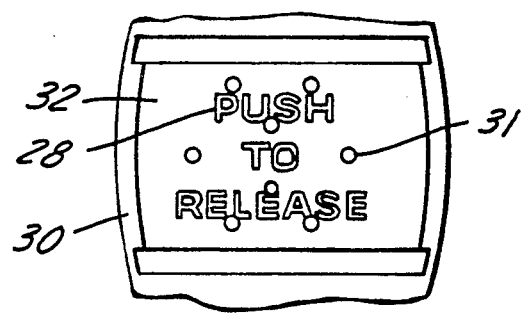
FIG. 8 is a fragmentary elevational view of a portion of FIG. 2.

The component 20 is preferably a somewhat elongated body which is curved rearwardly at the top and bottom and whose thickness is less than its length and width dimensions, as can be seen best in FIG. 3 and 5. On the rear side, the body 20 has a socket or recess 22 in which the plate 16 on the brake pedal lever 10 is received. The recess matches the shape and curvature of the plate 16 and is undercut and marginally encircled by a continuous flange 24 to retain the pad fitted on the brake pedal with the plate securely received the recess.

The insert 18 has a generally rectangular base 26 of uniform thickness which is curved to match the curvature of the body. Integral characters 28, in this instance lettering, project from a portion only of the front surface 29 of the base. The lettering may impart any desired information as, for example, the instructions "PUSH TO RELEASE".

The body 20 is formed of a slightly compressible, moldable material and is molded about the insert 18 under heat and pressure in a typical compression molding operation. The material of the body is compatible with the material of the insert so that after molding, the insert and body adhere to one another without the need of adhesives or primers.

Preferably the insert 18 is made of polypropylene reinforced with glass fibers. The amount of glass fiber filler may vary, but good results have been obtained when the glass fibers constitute about 30% by weight of the material of which the body is made The body 20 is made of a thermoplastic elastomer preferably containing polypropylene, and is somewhat flexible and compressible and has a friction surface similar to rubber. Ideally, the body is made entirely of polypropylene or at least a major amount, that is, more than 50% by weight, of polypropylene. The materials of the insert and body as thus compatible with one another and after the body 20 is molded about the insert 18, they weld or bond together and cannot easily be pulled apart. The heat necessary to soften the material forming the body 20 sufficiently to make it flowable enough for molding will vary depending upon the precise composition of the material of which the body is made. Gas venting holes 31 in the body 20 are for venting gas during molding and their number and placement is optional.

The body 20 has a mid-section 30 between its ends, and the mid-section has a front face 32. The base 26 of insert 18, when the insert is molded in the body, is fully encased within the mid-section of the body. The front surface 29 of the base 26 lies under the front face 32 of the body. The lettering 28 projects from a portion only of the front surface 29 of the base and extends through the front face 32 of the body, so that the tips of the lettering are disposed flush with the front face 32 and are clearly visible. The color of the insert 18 is preferably different than the color of the body 20 so that the lettering is easier to read. The rest of the front surface of the base, as well as the entire rear surface thereof, is overlain by the mid-section of the body so that the base is mechanically locked within the body, in addition to being held by the weld or bond that occurs between all contacting surfaces of the body and the encased insert as a result of the molding operation.

Preferably the body has corrugated surfaces 40 between the front face of the mid-section 30 and the ends of the body. These corrugated surfaces are formed by parallel, alternate ribs 42 and grooves 44.

What is claimed is:

1. A pad for a foot pedal such as a brake pedal on an automotive vehicle, comprising a body of a moldable material, and an insert of a material having raised characters on one surface thereof, said body being molded of a softer material than the material of said insert to provide a fractional resistance to prevent a foot from slipping off, said body being molded about said insert in a manner such that said insert is completely encased in said body except for the tips of said characters on said insert which project through and are visible at the surface of said body, said body and said insert being formed of compatible materials which adhere to one another.

2. A pad as set forth in claim 1, wherein the material of said body and the material of said insert each include polypropylene.

3. A pad as set forth in claim 2, wherein said insert is made of polypropylene reinforced with glass fibers.

4. A pad as set forth in claim 2, wherein said body is made of a thermoplastic elastomer containing polypropylene.

5. A pad as set forth in claim 1, wherein said insert is made of polypropylene reinforced with glass fibers, said body is made of a thermoplastic elastomer containing a major amount of polypropylene, and said body and said insert are bonded to one another.

6. A pad as set forth in claim 5, wherein said body is made substantially entirely of polypropylene.

7. A pad as set forth in claim 5, wherein said body is molded about said insert under heat and pressure causing them to bond together as aforesaid.

8. A pad as set forth in claim 5, wherein said body has a mid-section between its ends and said mid-section has a front face, said insert including a base of uniform thickness having a front surface covered by said front face of the mid-section of said body, said characters projecting from a portion only of said front surface of said insert through said front face of said mid-section of said body, the tips of said characters being flush with said front surface, and said mid-section overlying the remaining portions of said front surface of said insert to mechanically lock said insert in place.

9. A pad as set forth in claim 8, wherein said body is molded about said insert under heat and pressure causing them to bond together as aforesaid.

10. A pad as set forth in claim 9, wherein said body has corrugated surfaces between said front face of said mid-section and said ends thereof formed by parallel, alternate ribs and grooves.

11. A pad as set forth in claim 10, wherein said mid-section of said body has a rear surface formed to provide an undercut recess to receive an end portion of a brake pedal.

* * * * *